Oct. 12, 1954  E. L. SIMMONS  2,691,720
WALL AND CEILING LIGHT TRANSMITTING MEANS
Filed June 9, 1949  2 Sheets-Sheet 1
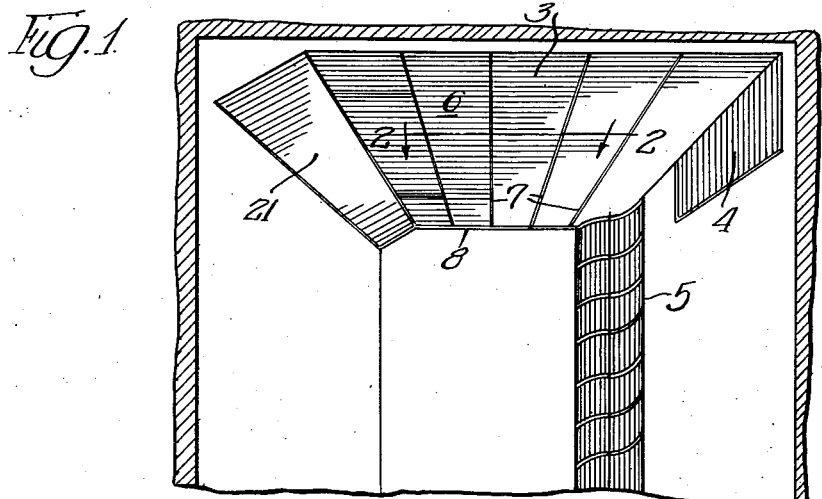
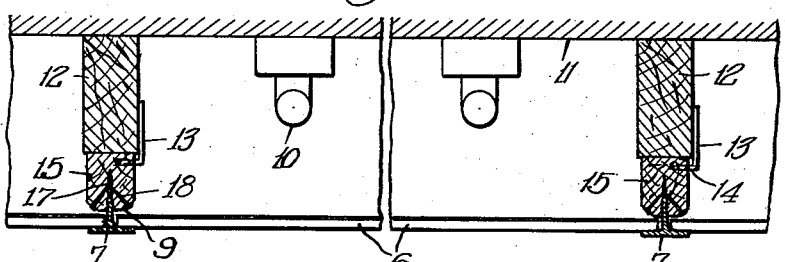
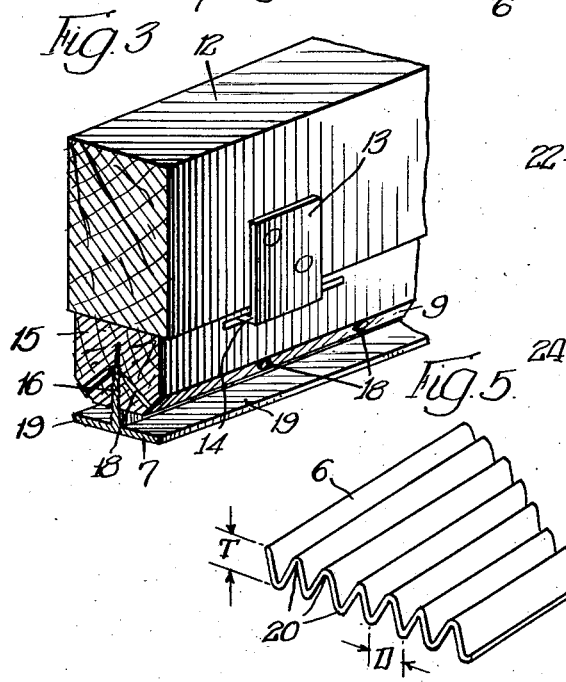
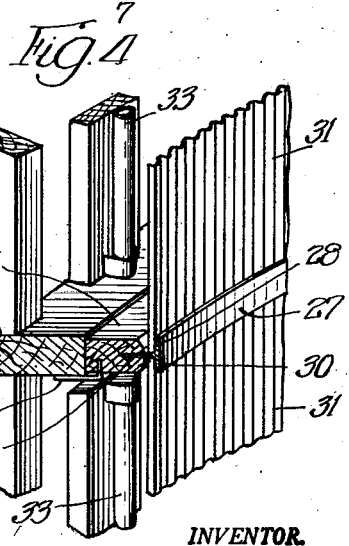
INVENTOR.
Elwyn L. Simmons,
BY
Cromwell, Greist + Warden
Attys.

Oct. 12, 1954  E. L. SIMMONS  2,691,720
WALL AND CEILING LIGHT TRANSMITTING MEANS
Filed June 9, 1949  2 Sheets-Sheet 2
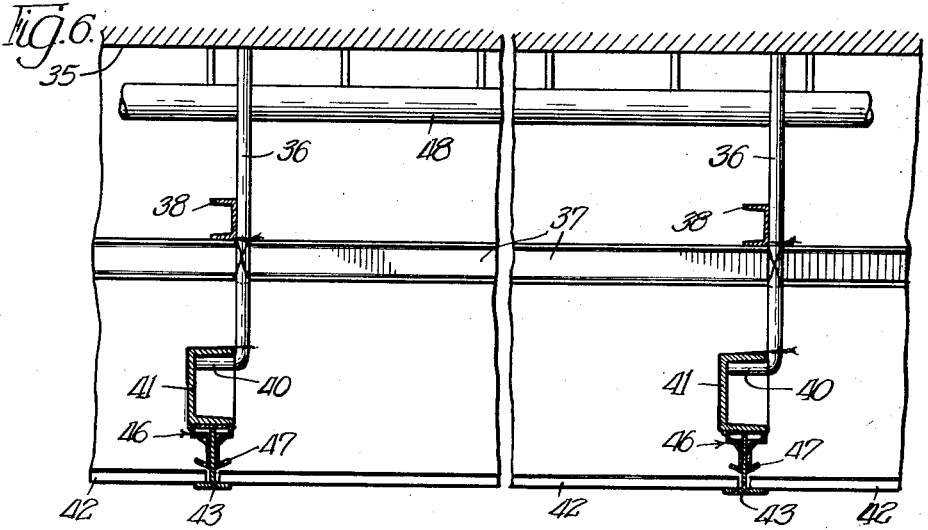
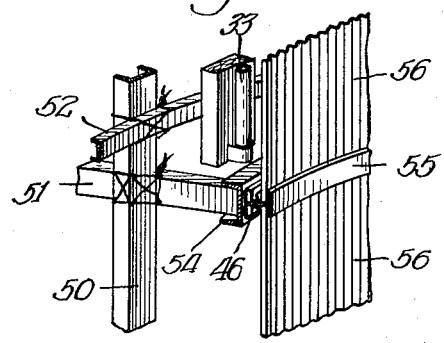
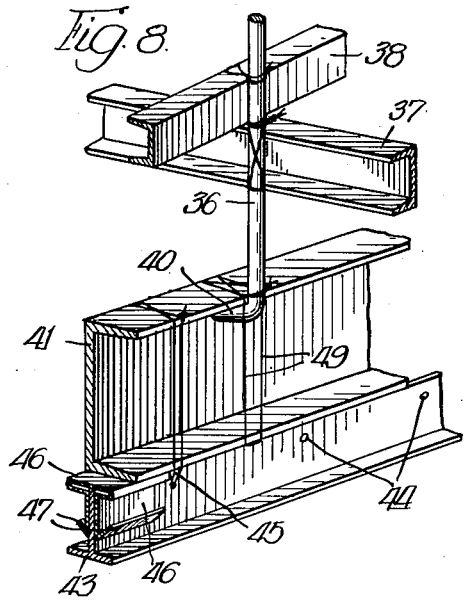
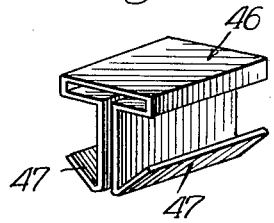
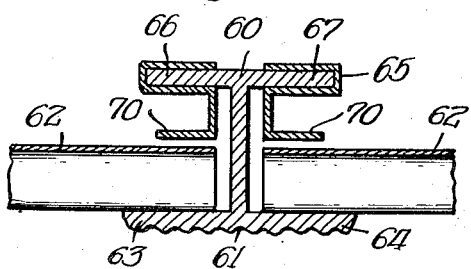
INVENTOR.
Elwyn L. Simmons,
BY
Cromwell, Greist & Warden
ATTYS Patented Oct. 12, 1954

2,691,720

UNITED STATES PATENT OFFICE 2,691,720

WALL AND CEILING LIGHT TRANSMITTING MEANS

Elwyn L. Simmons, Decatur, Ill.

Application June 9, 1949, Serial No. 98,079

4 Claims. (Cl. 240—9)

The present invention relates, generally, to new and useful improvements in artificial lighting of enclosed spaces, and it has particular relation to novel light transmitting and diffusing surface structures wherein the ceiling or side wall surfaces serve as the light transmitting and diffusing elements, these surfaces being substantially continuous and unbroken and formed by strips or panels of corrugated translucent plastic material.

The object of the present invention, broadly stated, is the provision of novel light transmitting and diffusing ceilings and side wall surfaces, which may be used either in new construction, or in remodeling, and which not only provide excellent illumination, but which also are highly ornamental and attractive.

A primary object of the present invention is the provision of light transmitting ceilings and side walls in the form of substantially continuous, unbroken areas of desired size and shape, the ceilings or side walls being formed substantially entirely of panels or strips of corrugated or accordioned, light transmitting plastic material supported only along their opposite edges by narrow support strips.

Another important object of the invention is the provision of light transmitting and diffusing ceilings and side walls formed of a plurality of individually supported panels or strips of corrugated translucent plastic material which are highly flexible along the lines of corrugation only and wherein the individual pleats of corrugations rigidify the strips or panels so that the same are self-supporting intermediate the opposite sides thereof either when laid flat or when stood on edge, said strips or panels being so supported that the same may be readily inserted and withdrawn from their normal side-by-side position.

Still another important object of the invention is the provision of light transmitting and diffusing installations for ceilings or side walls which are adapted to be easily installed, either underneath existing ceiling or in front of existing side walls, or as the original ceiling or side wall in a room under construction, the installation being light in weight, having high light transmission efficiency, and easily removed in strips or panels for cleaning or servicing, said installation being in the form of a plurality of parallel spaced, narrow support strips having laterally extending flanges when applied to a ceiling structure and vertically extending flanges when applied to a side wall structure on which relatively wide panels or strips of corrugated, translucent plastic material are supported intermediate each pair of narrow support strips with the corrugated panels or strips being supported only on their side edges which rest on, or are retained by, the lateral or vertical extending flanges, respectively.

Another important object of the present invention is the provision of a light transmitting and diffusing ceiling or side wall installation in the form of a substantially continuous unbroken surface or area, all portions of the ceiling or side wall areas being substantially equally and uniformly illuminated so as to transmit and diffuse approximately an equal amount of intensity of light, the light transmitting and diffusing surface being in the form of a plurality of strips or panels of corrugated translucent plastic material supported in side-by-side relationship by relatively narrow supporting or retaining strips.

Another object of the present invention is the provision of a substantially continuous, unbroken light transmitting and diffusing ceiling and side wall structures comprising a plurality of regularly arranged light sources with a light transmitting and diffusing ceiling or side wall surface supported beneath or in front of the light sources, said surface being in the form of adjacent strips or panels of corrugated translucent plastic material, such strips serving as barriers which prevent hot convection currents from said light sources from circulating in the room space, eliminate or materially to reduce the transmission of heat from the light sources into the room space, and completely conceal the light sources or fixtures from view.

Certain other objects of the invention will, in part, be obvious and will in part appear hereinafter.

For a more complete understanding of the nature and scope of the present invention, reference may now be had to the following detailed description thereof, taken in connection with the accompanying drawings, wherein:

Fig. 1 is a diagrammatic, perspective view of a room wherein the ceiling and side walls are provided with light transmitting and diffusing surface installations illustrating three different embodiments of the present invention;

Fig. 2 is a sectional view taken on line 2—2 of Fig. 1;

Fig. 3 is an enlarged, fragmentary perspective view showing the details of the supporting elements for the light transmitting and diffusing panels or strips of the ceiling installation shown in Fig. 1;

Fig. 4 is a fragmentary perspective view showing the details of construction of the corner lighting installation shown in Fig. 1;

Fig. 5 is an enlarged fragmentary, perspective view of a piece of one of the corrugated translucent plastic panels or strips which serve as the light transmitting and diffusing surface of the installations shown in Fig. 1;

Figs. 6 and 7 are views which correspond, generally, to Figs. 2 and 4, respectively, but showing a construction comprised entirely of non-combustible elements to comply with the provisions of fire safety codes;

Fig. 8 is an enlarged fragmentary perspective view showing the details of the supporing structure for the ceiling lighting installation shown in Fig. 6;

Fig. 9 is a perspective view of one of the clips utilized in connection with the installation shown in Figs. 6 and 7; and Fig. 10 is a sectional view showing another modification of my invention.

Referring to Fig. 1 of the drawings, a room is shown, the ceiling of which is provided with a light transmitting and diffusing ceiling installation made in accordance with the present invention and indicated generally at 3. The room is also provided with a flat side wall lighting installation 4 and a double-curved corner lighting installation 5, both also made in accordance with the present invention. The installation 3 consists of a plurality of panels or strips 6—6 of corrugated translucent plastic material arranged side-by-side so as to present a substantially continuous, unbroken rectangular expanse or area. The panels or strips 6 are individually supported between relatively narrow supporting strips 7—7 uniformly spaced and extending parallel to each other. The opposite ends of the installation 5 are closed and finished by molding strips 8 (only one being shown), at least one of which is arranged for easy removal and replacement. Preferably, the bottom surfaces of the supporting strips 7 as well as the moldings 8, have a decorative finish so as to contribute to the over-all attractiveness and appearance of the installation 5.

The lighting sources for the installation 5 are preferably in the form of fluorescent tubes, since this form of illumination is known to be highly efficient from the energy-consumption standpoint and emanates a minimum amount of heat, and is particularly adapted to uniform illumination of large areas. Referring particularly to Fig. 2 of the drawings, there is shown a plurality of fluorescent lighting fixtures 10—10. It will of course be understood that the particular type of the lighting fixtures is not critical in so far as the present invention is concerned, and if desired, other types of light sources may be used, such as incandescent electric lamps, cold cathode tubes, neon and zeon lamps, either with or without reflectors. In any case, the lighting sources usually should be arranged according to a regular pattern so as to evenly and uniformly illuminate the panels 6. In this connection, it will be understood that for certain decorative purposes and effects it may sometimes be desirable to have non-uniform lighting, or lighting involving different colors.

The lighting fixtures 10 are suitably mounted on a supporting structure which is indicated at 11, and which in a particular case may be the flooring of an upper room, or a roof board, or an existing ceiling. In the particular arrangement shown in Figs. 1 and 2, the supporting surface 11 is in the form of flooring laid onto joists 12—12 which in the installation 3 are used as the transverse supporting elements for the narrow support strips 7.

Spaced along the joists 12 are a plurality of brackets or angle members 13—13 (Fig. 3) the vertical arms of which are secured to the sides of the joists 12, as shown, while the horizontal bracket arms 14—14 are spaced from the bottoms of the joists 12 and project through openings provided therefor in supporting runners 15. The narrow inverted T-support strips 7 are in the form of a standard extruded product used for moldings, the vertical leg 16 of which has jagged side surfaces for retention in the longitudinal grooves 17—17 cut therefor in the runners 15. The legs 16 are driven up into the runners 15 as shown, and nails 18—18 are driven in at intervals as shown in Fig. 3 in order more securely to secure or fasten the strips 7 in place.

It will be seen that each of the support strips 7 provides two laterally extending flanges 19—19 on opposite sides of the center line thereof and that it is upon the opposed pairs of these flanges 19 that the panels 6 rest along their lateral edges. After the support strips 7 have been installed as shown, the panels 6 may be readily installed in place merely by unwinding a roll of the corrugated plastic material of suitable width and inserting the required length in between each opposed pair of flanges 19. Then each strip of plastic material is cut off at the proper length and another one of the panels 6 is put into place. The inclined surfaces 9—9 of the runners 15 serve to retain the panels 6 in place and prevent them from being lifted out of place.

Referring to Fig. 5 of the drawings, it will be seen that each of the panels 6 is composed of a series of corrugations having folds or creases 20—20 with the plastic material being substantially flat intermediate adjacent folds. Preferably, the thickness T of the panel or strip 6 is equal to or greater than the spacing D of the alternate creases 20.

The panels or strips 6 are very flexible along the creases or lines of corrugation 20, but these corrugations serve as rigidifying members with respect to deformation or flexure at right angles thereto. Accordingly, the panels 6, when laid flatwise, are self-supporting intermediate their opposite edges.

The panels 6 may be suitably formed of one of a number of plastic materials, including cellulose acetate, regenerated cellulose, polyethylene, one of the acrylate polymers or copolymers (e. g. methyl methacrylate), Vinylite, vinyl acetate, urea formaldehyde, etc. At least one of the surfaces of the panels 6 should be matted (i. e. have a dull finish) and this surface should be disposed downwardly when the panels are installed. The presence of such a surface gives better light diffusion and provides a more attractive surface than the shiny side of the panel.

The panels or corrugated strips 6 may be suitably formed in a number of known ways. Thus, a flat strip of the desired plastic may be deformed in a pleating machine of known type or in a suitable die, attention being given to such factors as temperature and moisture control in the case of cellulose acetate and similar plastic materials. If desired, the panels 6 may be extruded in the corrugated condition in the first instance.

It will be understood that the panels may be suitably tinted or colored if desired. Furthermore, if any particular plastic material is not normally fire-resistant, it is ordinarily desirable to modify them in accordance with known manner so as to render the same sufficiently fire-resistant for building purposes.

The panels 6 may be easily removed from their normal installed position in order that the lighting fixtures 10 may be reached and serviced, and in order that the panels 6 may be suitably cleaned as by washing or brushing. As indicated above, one of the end molding strips 8 is arranged to be easily removed and replaced thereby permitting the respective panels 6 to be withdrawn and inserted in a convenient manner.

It will be apparent that the light transmitting and diffusing ceiling structure of the present invention may be installed in a number of different ways from that shown and described in connection with Figs. 1 and 2. For example, the structure may be installed in a slanted or inclined ceiling section as indicated, generally, at 21 in Fig. 1, instead of in, or as, a horizontal ceiling. If the panels or individual strips of corrugated plastic material are arranged so that their length extends parallel to the incline of the ceiling as distinguished from extending crosswise thereof, then some arrangement should be made for securing the strips at their upper ends so as to prevent sagging or downward distortion.

Referring to Fig. 4 of the drawings, there is shown therein the details of construction of the double curved corner lighting installation 5 of the room shown in Fig. 1. A plurality of uprights 22—22 have notches 23 cut therein at suitable levels so as to support curved plates 24. The plates 24 can be considered to correspond to the joists 12 in Fig. 2. Curved runners 25 are supported in front of the plates 24 at the same level by means of a plurality of brackets 26—26. The long legs of the brackets 26 are secured to the bottom surface of the plate 24, as shown, and the shorter leg or arm extends vertically so as to fit in a slot provided therefor in the bottom or lower portion of the runners 25.

A curved molding strip 27, having a T-shaped cross section, fits into the front edge of the curved runners 25 in the same manner that the straight molding strips 7 fit into the bottom portions of the straight runners 15 in Figs. 2 and 3. In the construction shown in Fig. 4, however, the vertically extending flanges 28 and 30 of the molding strip 27 serve to retain in place curved panels 31—31 of the corrugated or pleated light transmitting and diffusing material. It will be seen that in the structure shown in Fig. 4 the corrugations extend vertically so that the panels 31 are supported on the lower edge thereof in each case, which rests on the upper surfaces of the horizontal leg 32 of the molding strip 27.

The corner installation 5 is illuminated by means of a plurality of fluorescent lighting fixtures indicated at 33—33 in Fig. 4. These lighting fixtures 33 extend vertically and are disposed in rear of the panels 31. The curved plates 24 may be used for supporting the lighting fixtures, as shown.

Any desired curvature can be obtained using the construction shown in Fig. 4 since the panels 31 are capable of being bent at almost any angle and may take the form of double of reversed curves, as shown.

The flat side wall lighting installation 4 shown in Fig. 1 may have a construction corresponding to that for the curved corner installation 5 but in this case the corrugated panels will be supported in a flat or plane surface which is flush with the remainder of the side wall in which the installation 4 is located. The flat side wall installation 4 is particularly useful in connection with schoolrooms since it can be used to simulate the most modern and approved designs wherein the light enters the room from one side.

In the various installations described so far in connection with the room shown in Fig. 1, the supporting structure for the light transmitting and diffusing panels has been formed of wooden members. In a number of localities, particularly large cities and towns, this wooden supporting structure will not comply with existing building code provisions in respect to being sufficiently fire-resistant. Accordingly, in Figs. 6–8 I have shown corresponding types of installations which utilize metal supporting framework and structural members and thus constitutes the full compliance with the most exacting and modern building code.

Referring now to Figs. 6 and 8 of the drawings, there is shown an illuminated light transmitting and diffusing ceiling installation which corresponds to installation 3 in Fig. 1. In Fig. 6 the reference numeral 35 designates a fireproof floor construction of known type, formed for example from reinforced concrete. Underneath the ceiling 35, and at the corners of a series of rectangles having four foot sides, for example, there depend a plurality of support rods 36—36 which are suitably anchored in the floor 35. These support rods 36 are braced by means of a grid structure formed by a plurality of channels 37—37 positioned at four foot centers and extending parallel to each other and having superposed thereon a plurality of cross channels 38—38 also positioned on four foot centers and extending crosswise of the channel 37. The vertical rods 36 are securely wired to the channels or grids 37 and 38 as shown in Fig. 6.

The rods 36 extend beneath the channels 37 and have laterally turned end portions 40 as seen in Figs. 6 and 8, the horizontal end portions 40 extending underneath the upper flange of a series of channel members 41 in a bearing support relationship. The connection between the ends 40 and the channels 41 is made secure by means of the wire ties 49 as indicated in Fig. 8. Thus, underneath the grid formed by the channels 37 and 38, there extends a plurality of spaced parallel channels 41 which are located or positioned on four foot centers. It will of course be understood that the spacing of the channels 36, 37 and 41 may be greater or less than four feet on the center, as desired. However, the spacing of the support panels 41 should in no case be in excess of the width of the light transmitting and diffusing panels 42—42 supported therebetween as shown in Fig. 6.

The panels 42—42, like the panel 6 in Fig. 2, are supported between the oppositely extending horizontal flanges of the molding strips 43—43. The molding strips 43 may be identical with the molding strips 7 described above in connection with Figs. 2 and 3, except that a plurality of holes 44—44 (Fig. 8) extend through the vertical leg portion of the T-members 43. The purpose of the holes 44 is to permit wire to be threaded therethrough so as to secure the T-members 43 underneath the channel support members 41 as shown at 45 in Fig. 8.

In order to prevent the T-members 43 from rocking underneath the channels 41 and also to prevent the corrugated panels 42 from lifting out of place, a plurality of short clips 46 are slipped over the upper edge of the vertical leg of the T-member 43 as shown in Fig. 8. A perspective view of one of the clip members 46 is shown in Fig. 9. The clip member 46 is formed of sheet metal, such as steel or aluminum, and should have sufficient rigidity so as not easily to be deformed in handling. It will be seen that the clip 46 is in the form of a T with upwardly inclined retaining projections 47—47 extending from the bottom thereof on opposite sides.

In the installation shown in Figs. 6 and 8, the lighting source is indicated generally at 48 and is in the form of an elongated lighting fixture having a reflector trough with long fluorescent tubular lamps disposed therein. The lighting fixtures 48 are supported adjacent the ceiling 35 and extend crosswise of the length of the panels 42. The advantage of this arrangement is that the light from the fixtures 48 is widely and evenly diffused as it reaches the panels 42 and the light is evenly and uniformly transmitted and diffused through these panels with practically complete elimination of shadows so that the supporting structure is not visible from a position beneath the installation. If desired, the lighting fixtures may be supported from the lower construction grid.

Referring to Fig. 7 of the drawings, there is shown a curved side wall lighting fixture which corresponds to that shown in Fig. 4 but which has the fire-resistant or fireproof construction of the ceiling installation described above in connection with Figs. 6 and 8. Thus a plurality of upright channels 50 are provided which serve as supports for the horizontal channel members 51 which are suitably secured to the columns 50 as by wiring. These columns 50 also serve to support a series of cross channel sections 52 on which fluorescent lighting fixtures 33—33 are located. The curved channel member 54 is supported on the outer ends of each series of cross members 51 and a curved molding strip 55 is wired to the curved support channel 54 in the manner described above in connection with the wiring of the molding strips 43 to the support channels 41. A plurality of the clips 46 are also positioned on the leg of the molding 55, as shown, so as to give a rigid bearing connection between the channel 54 and the molding 55.

The panels of the corrugated light transmitting and diffusing material 56—56 are supported on the molding 55 and retained in position thereby, as shown.

In Fig. 10 of the drawings there is shown a modified form of molding for use in supporting the panels of corrugated light transmitting and diffusing material, either in the horizontal or in the vertical position. Referring to Fig. 10, the reference numeral 60 indicates an H-shaped member laid on the side with the bottom or exposed surface being given a somewhat ornamental appearance as indicated by the fluting 61. The H-member 60 is supported in a suitable manner from a superstructure, as by wiring or bolts, or other approved arrangements. The panels of corrugated plastic material 62—62 are supported above the laterally extending flanges 63—64 as shown.

In order to retain the lightweight panels 62 in position and to prevent them from being lifted out of place, a plurality of small S clips 65 may be fitted on the upper flanges 66—67 at suitable intervals. The clips 65 have portions which fit over the flanges 66—67 and then have depending portions which provide horizontal flanges 70 for extending over the top of the edges of the panels 62, as shown.

The ceiling and side wall light transmitting and diffusing structures of the present invention are not limited to use in connection with artificial lighting but where desired, can be utilized in connection with natural lighting as provided for in skylights, for example.

Since certain further changes may be made in the foregoing construction and different embodiments of the invention may be made without departing from the spirit and scope thereof, it is intended that all matter shown in the accompanying drawings or described above, shall be interpreted as illustrative and not in a limiting sense.

I claim:

1. A luminous ceiling comprising a ceiling superstructure, at least one pair of parallel spaced support strips having laterally extending support flanges, means for suspending said support strips from said superstructure, a flexible elongated panel consisting of transversely corrugated translucent plastic sheeting laying on and supported by and between said pair of support strips with the side edges of said panels resting on said laterally extending flanges, said elongated panel being sufficiently flexible so as to be windable into roll form and said corrugations rigidifying said panel sufficiently to render it self-supporting intermediate said support strips, and illuminating means suspended from said superstructure above said panels.

2. A luminous ceiling comprising a ceiling superstructure, a plurality of spaced parallel support strips having laterally extending support flanges, means for suspending said support strips from said superstructure, flexible elongated panels consisting of transversely corrugated translucent plastic sheeting laying on and supported by and between each pair of said support strips with the side edges of said panels resting on said laterally extending flanges, each of said elongated panels being sufficiently flexible so as to be bendable at least about 90° to itself along said corrugations and said corrugations rigidifying said panels so that they are self-supporting intermediate said support strips, and illuminating means suspended from said superstructure above said panels.

3. A luminous ceiling for a room comprising an unfinished ceiling superstructure, a plurality of spaced parallel support strips extending across the ceiling area of said room and having laterally extending support flanges, means for suspending said support strips from said superstructure, flexible elongated panels consisting of transversely corrugated translucent plastic sheeting laying on and supported by and between each pair of said support strips with the side edges of said panels resting on said laterally extending flanges, each of said elongated panels being sufficiently flexible so as to be bendable at least about 90° to itself along said corrugations and said corrugations rigidifying said panels so that they are self-supporting intermediate said support strips, and illuminating means suspended from said superstructure above said panels.

4. A luminous wall for a room comprising a sidewall structure, a plurality of spaced parallel support strips extending horizontally across said wall having vertically extending retaining flanges, means for attaching said support strips to said sidewall structure, flexible elongated panels consisting of transversely corrugated translucent plastic sheeting with each panel resting on the lower one of a pair of said support strips and with the top and bottom edges of said panels being retained from falling into said room by said flanges, each of said elongated panels being sufficiently flexible so as to be windable into a roll and said corrugations rigidifying said panels so that they are self-supporting intermediate said support strips, and illuminating means supported from said sidewall structure behind said panels.

References Cited in the file of this patent

UNITED STATES PATENTS

| Number | Name | Date |
|---|---|---|
| 1,106,776 | Burky | Aug. 11, 1914 |
| 1,740,229 | Dorey | Dec. 17, 1929 |
| 2,022,078 | Dorey | Nov. 26, 1935 |
| 2,150,344 | Schilling | Mar. 14, 1939 |
| 2,258,354 | Doane | Oct. 7, 1941 |
| 2,293,672 | Bookman | Aug. 18, 1942 |
| 2,334,005 | Hoeveler | Nov. 9, 1943 |
| 2,366,216 | Roberts | Jan. 2, 1945 |
| 2,397,388 | Troedsson | Mar. 26, 1946 |
| 2,398,507 | Rolph | Apr. 16, 1946 |
| 2,485,133 | Behnke | Oct. 18, 1949 |

FOREIGN PATENTS

| Number | Country | Date |
|---|---|---|
| 17,277 | Great Britain | May 25, 1911 |

OTHER REFERENCES

Illuminating Engineering, April 1949, pages 221, 222.

Publication, Rohm & Haas Co., Form 20B, April 1948.

Brochure "Wakefield Ceiling." Copyright July 13, 1951.

"Sweets File Architectural," Section 31a, Sweets Catalogue Service. Copyright 1952.